United States Patent [19]

Oguchi et al.

[11] Patent Number: 4,648,691

[45] Date of Patent: Mar. 10, 1987

[54] LIQUID CRYSTAL DISPLAY DEVICE HAVING DIFFUSELY REFLECTIVE PICTURE ELECTRODE AND PLEOCHROIC DYE

[75] Inventors: Koichi Oguchi; Minoru Hosokawa; Satoru Yazawa; Mitsuo Nagata, all of Suwa, Japan

[73] Assignee: Seiko Epson Kabushiki Kaisha, Tokyo, Japan

[21] Appl. No.: 218,582

[22] Filed: Dec. 19, 1980

[30] Foreign Application Priority Data

Dec. 27, 1979 [JP] Japan ................. 54-173050

[51] Int. Cl.$^4$ ............................................. G02F 1/13
[52] U.S. Cl. ..................... 350/338; 350/333; 350/339 D; 350/349; 350/336
[58] Field of Search ............... 350/278, 338, 339 D, 350/333, 349, 332, 336, 338; 427/162, 163, 164, 166, 262; 252/299.1

[56] References Cited

U.S. PATENT DOCUMENTS

| | | |
|---|---|---|
| 3,862,360 | 1/1975 | Dill et al. |
| 3,865,469 | 2/1975 | Asai et al. ............... 350/349 |
| 3,881,809 | 5/1975 | Fergason et al. ............ 350/338 |
| 3,994,567 | 11/1976 | Matsuo et al. ............. 350/343 X |
| 4,103,297 | 7/1978 | McGreivy et al. ........... 350/333 X |
| 4,106,859 | 8/1978 | Doriguzzi et al. ........... 350/338 |
| 4,126,383 | 11/1978 | Doriguzzi et al. ........... 350/338 |
| 4,158,484 | 6/1979 | Nishiyama ................ 350/338 |
| 4,185,894 | 1/1980 | Hilton et al. .............. 350/338 |
| 4,213,676 | 7/1980 | Kaufmann ............... 350/338 X |
| 4,239,346 | 12/1980 | Lloyd .................... 350/333 X |
| 4,266,859 | 5/1981 | Togashi ................. 350/339 D X |

FOREIGN PATENT DOCUMENTS

| | | | |
|---|---|---|---|
| 2832537 | 2/1979 | Fed. Rep. of Germany | 350/338 |
| 2744034 | 3/1979 | Fed. Rep. of Germany | 350/338 |
| 1094846 | 8/1976 | Japan | 350/339 R |
| 0049155 | 4/1979 | Japan | 350/339 R |
| 1434906 | 5/1976 | United Kingdom | 350/338 |

OTHER PUBLICATIONS

Stepke, E. "Liquid Crystals: Perspectives, Prospects, and Products", *Electro-Optical Systems Design* (Feb. 1972), pp. 20–26.
Constant, J. et al., "Pleochroic Dyes with High-Order Parameters for Liquid Crystal Displays", *Electronics Letters*, vol. 12, No. 20 (Sep. 30, 1976), pp. 514–515.
Meier, G. et al., *Applications of Liquid Crystals*, Springer Verlag, Berlin, 1975, p. 98.

*Primary Examiner*—John K. Corbin
*Assistant Examiner*—Richard F. Gallivan
*Attorney, Agent, or Firm*—Blum Kaplan Friedman Silberman & Beran

[57] ABSTRACT

A liquid crystal display device wherein display elements are arranged in a matrix display on a substrate and the display is driven in response to external display signals is provided. The display device includes a thin film layer having a rugged diffusing surface and an opposed transparent electrode plate spaced apart from the thin film layer. A guest-host liquid crystal material including a pleochroic dye is utilized. The thin film layer may be a metal film such as, aluminum, an aluminum alloy, silver or a silver alloy having a rugged surface for providing a diffused white surface formed by vaccum evaporation, sputtering, heat-treatment, recrystallization or etching.

46 Claims, 27 Drawing Figures

LIQUID CRYSTAL DISPLAY DEVICE HAVING DIFFUSELY REFLECTIVE PICTURE ELECTRODE AND PLEOCHROIC DYE

BACKGROUND OF THE INVENTION

This invention relates generally to a liquid crystal display device, and more particularly to a guest-host type liquid crystal display device, and in particular, to a guest-host type liquid crystal display device including liquid crystal driving elements arranged in a matrix array.

Presently there is widespread demand for devices which can display a wide variety of information rapidly and in great detail. Under these circumstances, information processing devices designed for personal use are under active development. These devices includes devices such as, a pocket calculator, an electronic wristwatches including a calculator and a portable electronic translator. These information processing devices designed for personal use must be small and thin. Additionally, the device must have displays which are driven at low voltages as the power consumption of the device must be low. In view of this many display devices designed for personal use which display information must possess the same characteristics.

It is expected that information processing apparatus, such as a portable television receiver will soon be widely accepted in the market. Such portable television receivers will receive television signals and display the image on a display device. The display device included in a portable television receiver, as well must be able to be driven at low voltages so that there is low power consumption as in the other personal information processing apparatuses. Additionally, the devices must be small and thin as well as possess the ability to display efficiently both inside and outside the home.

There are various types of display devices which initially satisfy these requirements. For example, a thin type CRT (cathoderay tube), a plasma display and EL (electro luminescence) display, a LED (light emitting diode) display, an EC (electro-chromic) display and the liquid display are currently under consideration for use. Among these types of display devices, the liquid crystal display most sufficiently satisfies the design requirements noted above and is now widely accepted for use as a display device for the electronic calculator and for electronic wristwatches.

There are principally two methods for driving a liquid crystal display. The first is the static driving method and the second is a multiplex driving (time sharing driving) method. Both driving methods are under consideration and are now being developed for driving the liquid crystal display device to be utilized in a television receiver. The static driving method is more desirable in the case of a portable television receiver in that the liquid crystal display is driven at low voltage and has a low power consumption.

In the static driving method, liquid crystal driving elements are arranged in a matrix on one of the base plates which constitute the liquid crystal display cell. Each of the driving elements includes an electrode for driving the liquid crystal. This electrode and associated liquid crystal driving elements constitute one picture element of the display device. The picture elements are selectively driven by external signals for displaying the desired image. In this case, the voltage applied to each liquid crystal driving electrode is statically applied to the liquid crystal material. In such a liquid crystal display cell one of the base plates is often opaque, and thus the device operates in a reflection-type display mode.

An example of the structure and circuit diagram of a statically driven liquid crystal will be described in connection with FIGS. 1-3. A device driven in a multiplex mode is shown in U.S. Pat. No. 3,862,360. The device of this patent includes a liquid crystal display panel formed by sandwiching a thin layer of liquid crystal material between a glass plate which has a transparent electrode covering one surface and a back plate which has a matrix array of reflective electrodes formed thereon. Individual addressing and storage circuits for each cell are formed contiguous to the reflective electrodes.

Such display devices operating in the DSM mode have the advantage that it is possible to display black and white images without a polarizer. However, since the current flowing in the liquid crystal layer is large as compared with a liquid crystal display device operating in the FEM (field effect mode) utilizing a twisted nematic liquid crystal material, its power consumption and its dependence in viewing angle are also very large. Accordingly, it has been difficult to apply the DSM type of display device to the portable television receiver. Accordingly, it is desirable to provide a liquid crystal display device which overcomes the disadvantages of the conventional liquid crystal device of the static driving mode which has been used in a television receiver using DSM liquid crystal material.

SUMMARY OF THE INVENTION

Generally speaking, in accordance with the invention, an improved liquid crystal display device utilizing a guest-host liquid crystal material wherein one of the base plates for constituting the liquid crystal cell is a substrate having a thin film layer with a rugged surface thereon is provided. The guest-host liquid crystal material is a mixture of a nematic liquid crystal material and a pleochroic dye or a phase transition liquid crystal material and a pleochroic dye. When a voltage is applied to the liquid crystal layer, the pleochroic dyes are oriented in the same manner as the liquid crystal molecules for providing a color display. Such a liquid crystal display device requires a diffusing white lower substrate.

Liquid crystal display devices in accordance with preferred embodiments of the invention include display elements arranged in an active matrix array on a semiconductor or a glass substrate. The substrate includes a thin film layer having a rugged surface for scattering or diffusing incident light in every direction. The thin film layer may be a metal thin film formed of aluminum, an aluminum alloy, silver or a silver alloy. The thin film may be applied by methods, such as vacuum evaporation, sputtering, heat-treatment and recrystallilzation, etching or sand-blasting.

The liquid crystal driving elements may be monolithically formed on a silicon semiconductor substrate. The metal thin film layer may include two thin film layers with an insulating film layer of $SiO_2$, $Al_2O_3$, $Si_3N_4$, or the like therebetween. When the driving elements are formed on a semiconductor substrate, relatively large gaps exert a negative influence when the surface is prepared for orienting the liquid crystal material. In this case, a transparent film, such as a silicon resin, epoxy resin, polyimide resin or an inorganic resin may be applied over the driving elements. A thin insulating film also interrupts application of direct current to the liquid crystal material thereby extending its useful life.

Accordingly, it is an object of the invention to provide an improved liquid crystal display device.

Another object of the invention to provide an improved liquid crystal display device wherein one of the base plates which constitute the liquid crystal cell is provided with liquid crystal driving elements arranged in a matrix array.

A further object of the invention is to provide an improved liquid crystal display device suitable for use in a portable television receiver.

Still another object of the invention is to provide improved liquid crystal display device including a guest-host type liquid crystal material.

Still a further object of the invention is to provide an improved liquid crystal display device having a diffusing white lower substrate.

Yet another object of the invention is to provide a method for forming a diffusing white lower substrate for a liquid crystal display device.

Yet a further object of the invention is to provide a material suitable for forming a diffusing white lower substrate for a liquid crystal display device.

It is another object of the invention to provide an improved liquid crystal display device wherein one of the base plates which constitutes the liquid crystal cell is a thin film diffusing white layer and includes a guest-host liquid crystal material.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
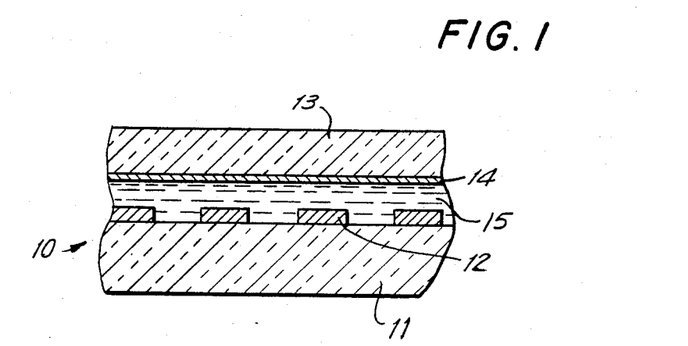
FIG. 1 is a cross-sectional view of a liquid crystal display device including a semiconductor substrate.
Figure 2:
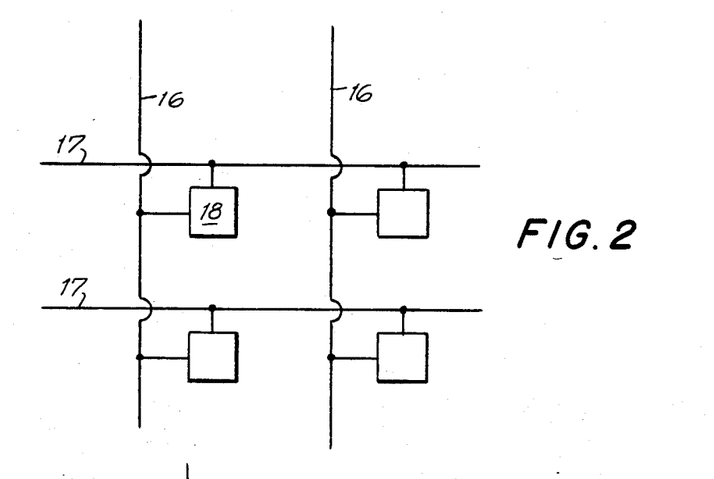
FIG. 2 is a schematic representation illustrating the arrangement of liquid crystal driving elements in matrix array.
Figure 3:
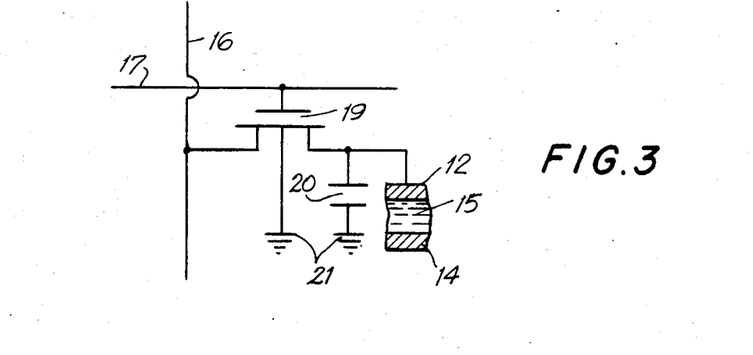
FIG. 3 is an addressing circuit for the liquid crystal display device of FIGS. 1 and 2.
Figure 4:
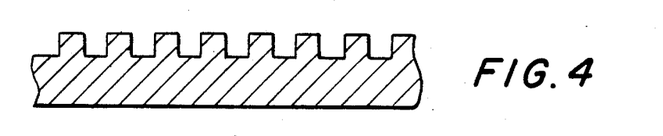
FIG. 4 is a sectional view of the rugged surface of a thin film metal layer utilized in the device in accordance with the invention.

Referring now to FIGS. 1–3, the structure of a liquid crystal display cell which is statically driven and the circuit diagram therefor are shown. FIG. 1 is a sectional view of a liquid crystal display device 10 formed by a semiconductor substrate 11 and a spaced apart and opposed upper glass plate 13. Semiconductor substrate 11 may be a silicon substrate having a liquid crystal driving electrode 12 disposed thereon in a selected pattern and a common electrode 14 disposed on upper glass plate 13 with a liquid crystal material 15 in the space between substrate 11 and glass plate 13. The liquid crystal driving elements which will be described in connection with FIG. 3 are arranged in a matrix on substrate 11 and electrically connected to liquid crystal driving electrodes 12.

FIG. 3 illustrates the circuit diagram of the addressing circuit for driving the liquid crystal display elements. A data line 16 carries a data signal to a liquid crystal driving element 18 and a timing line 17 carries a timing signal to liquid crystal driving element 18. The addressing circuit includes a MOS transistor 19 coupled between data line 16 and timing line 17 and liquid crystal driving electrode 12. A capacitor 20 is coupled to driving electrode 12 in order to maintain it at a potential 21 of semiconductor substrate 11.

In liquid crystal display device 10 of the type illustrated in FIGS. 1–3, when statically driven, the display is addressed one line at a time. This is to say that when a signal is applied to selected timing signal line 17, the gate of MOS transistor 19 becomes ON and the voltage of data signal line 16 is applied to capacitor 20. The voltage of capacitor 20 is then applied to liquid crystal material 15 for a selected time interval and passes through liquid crystal driving electrode 12 for performing the display. By successively scanning timing lines 17, it is possible to display a television-type image.

In a liquid crystal display device wherein the liquid crystal material is driven by conventional static driving as in display device 10 illustrated in FIGS. 1–3, only one polarizer plate (not shown) need be used because the device performs in a reflection-type display mode. Accordingly, the DSM liquid crystal material is used together with a thin metal layer having a highly reflective surface for the liquid crystal driving electrode. As noted above, in this type of construction current drain is large compared to the FEM liquid crystal display device so that power consumption and dependence on view angle are large. These shortcomings can be overcome in accordance with the invention as will now be described in detail.

A display device constructed and arranged in accordance with the invention includes a guest-host type liquid crystal material and a substrate having a diffusing white surface. This liquid crystal material is a mixture of a pleochroic dye as a guest and the liquid crystal material as a host disposed in the space between the two base plates forming the cell. When a voltage is supplied to the guest-host liquid crystal layer, the pleochroic dyes are oriented in the same direction as the liquid crystal molecules for providing a color display.

Generally, the display device including a guest-host liquid crystal material will have the following characteristics. (1) A reflection mode type display is possible, but it is desirable to include a lower substrate which is diffusing white in order to improve the contrast. (2) It is possible to operate the display with or without a polarizer. (3) The liquid crystal material can be driven with low power and a low voltage of from 3 to 5 V, as compared with a display device utili ing a DSM liquid crystal material. (4) The dependence on viewing angle is significantly reduced compared to the DSM liquid crystal material display device. (5) The slope of the voltage-contrast characteristic is gradual, thereby a grey scale display is easily performed.

Accordingly, such a liquid crystal display device has excellent characteristics, but its application for the desired use has been difficult because the lower substrate must be diffusing white in order to provide sufficient contrast. Generally, the thickness of the liquid crystal layer between the two base plates is too thin, namely from about 3 to 20 $\mu$m, to permit formation of a white thin film layer on the substrate without restriction in terms of method of application and structure. Therefore, it is desirable that the thickness of the white thin film layer be at least about from 0.1 to 10 $\mu$m.

In accordance with a first embodiment or the invention, a thin film layer of metal having a rugged surface is utilized as a white film layer. The rugged film layer has an irregular or jagged surface which may be of the type illustrated in FIGS. 4–15. In each case incident light is reflected, or in effect scattered or diffused, in every direction at the concave or convex portions. Accordingly, the thin metal layer appears white. The degree of whiteness which a thin metal film layer displays increases as the reflectance upon a surface increases. Accordingly, it is desirable to provide a metal thin film layer of an aluminum material, such as aluminum or an aluminum alloy, or a silver material, such as silver or a silver alloy.

Figure 14A:
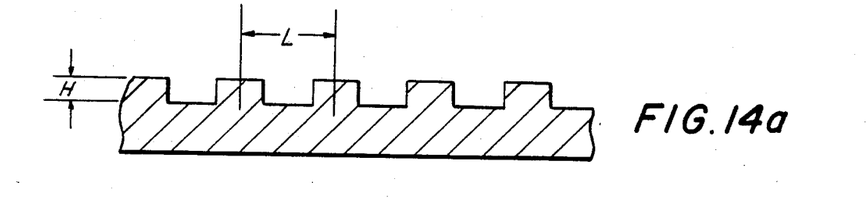
FIGS. 14(a), 14(b) and 14(c) illustrate the relative dimensions of a rugged surface of a metal thin film layer utilized in accordance with the invention.
Figure 14B:
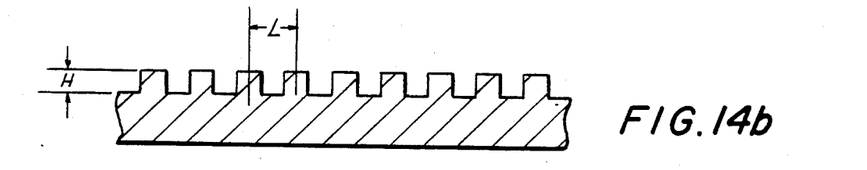
Figure 14C:
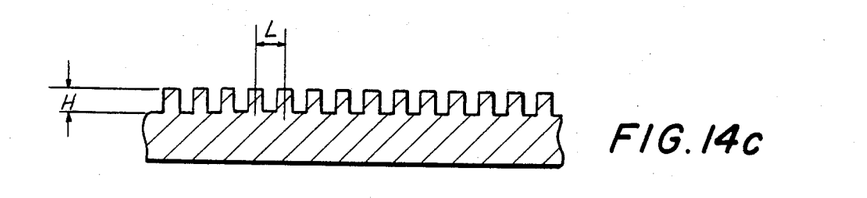

Referring now to FIGS. 14(a), 14(b) and 14(c), it has been found that the degree of whiteness varies and is dependent upon the variation in height (H) between the convex and concave regions of the surface and the distance (L) between the centers of the convex and concave portions. Accordingly, it is necessary to control these factors sufficiently for providing the desired degree of whiteness.

In the case of the surface illustrated in FIG. 14(a), L is substantially larger than H. In this case the surface of the metal thin film layer operates as a specular or mirrored surface, because the reflected component of the light is larger than the scattered component. In the case where L is about equal to H, as shown in FIG. 14(b), the majority of incident light is scattered so that the surface of the metal thin film layer appears white. In the case wherein L is substantially less than H, as shown in FIG. 14(c), the surface of metal thin film layer appears dark (grey through black), because the incident light is absorbed in the concave regions.

In the illustrations in FIG. 14, H, the height between the convex portion and the concave portion, is approximately 0.01 to 2.0 $\mu$m. If width L is greater than height H, namely L larger than H as shown in FIG. 14(a), an insulating layer may be sandwiched between two metal thin film layers as shown in the embodiment illustrated in FIG. 15. In this embodiment, a multi-layer structure is provided so that the thin film layer appears white in the same manner as shown in FIG. 14(b) wherein L=H.

Figure 15:
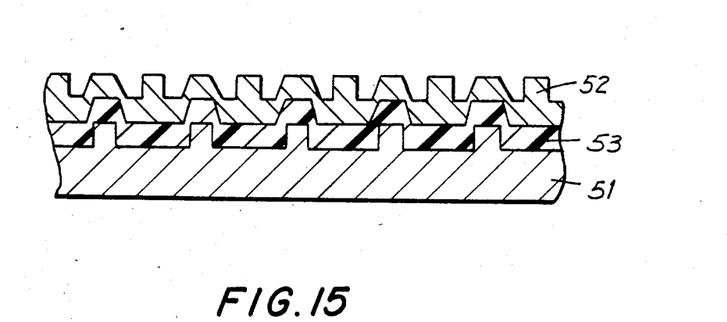
FIG. 15 is a cross-sectional view of a diffusing white thin film layer including two thin film metal layers, each with a rugged surface and an insulating material disposed therebetween in accordance with the invention.

Referring now to FIG. 15, a first metal thin film layer 51 having a rugged surface wherein L larger than H is formed on a substrate (not shown) and a thin insulating layer 53 is disposed thereon. A second metal thin film layer 52 having a rugged surface wherein L=H is disposed thereon. Thin insulating layer 53 may be formed of SiO$_2$, Si$_3$N$_4$, (Al$_2$O$_3$, etc.) which is formed by CVD (chemical vapor deposition) or spattering. Upper or second thin film metal layer 52 with a rugged surface can be formed by one of the following methods: (1) vacuum evaporation or sputtering; (2) formation of a metal thin film layer by vacuum evaporation or sputtering followed by heat-treatment and recrystallization; (3) formation of a thin film layer by vacuum evaporation or sputtering, followed by heat-treatment with a portion of the surface of the thin layer containing precipitated particles removed by etching. Vacuum evaporation or sputtering may be utilized for providing a metal thin film layer having a rugged surface under specific conditions. Specifically, the substrate is maintained at high temperature, namely above 100° C. and a small amount of water is maintained in the atmosphere, both in vacuum evaporation and sputtering. In this manner, it is possible to provide a metal thin film layer having a rugged surface of the type illustrated in FIG. 4. The height H between the top and bottom of the rugged surface is in the region from about 0.1 to 2.0 μm.

When using a lower temperature and high speed sputtering machine of the magnatron type, the aluminum target containing 2% by weight of silicon is sputtered with a power of 390 V × 8.2 A and at a pressure of 10 atmosphere of argon. The distance between the target and the substrate is maintained at 3.5 inches. The surface color of the metal thin film layer formed on the substrate generally appears milky to white and then to grey as the sputtering time increases from 3 to 5 to 10 minutes, respectively, and so on. Following that time, the difference between the top and bottom of the rugged metal surface which appears white was about 1.0 μm and the average distance from a convex portion to the next convex portion was approximately 1.0 to 1.5 μm.

Figure 5:
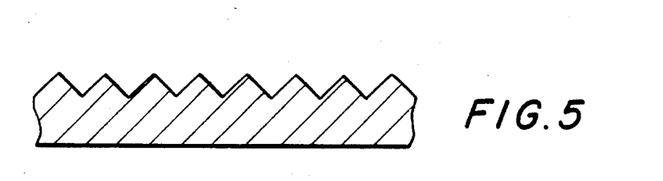
FIG. 5 is a sectional view of the rugged surface of a metal thin film layer utilized in accordance with another embodiment of the invention.
Figure 6:
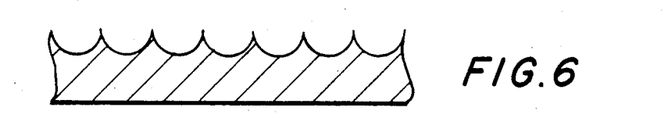
FIG. 6 is a sectional view of the rugged surface of a metal thin film layer utilized in a further embodiment of the invention.
Figure 7:
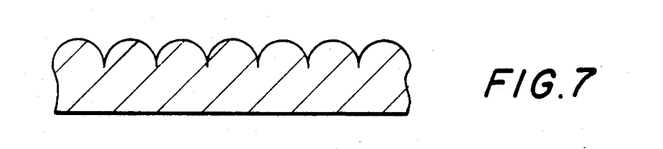
FIG. 7 is a sectional view of the rugged surface of metal thin film layer utilized in yet another embodiment of the invention.
Figure 8:
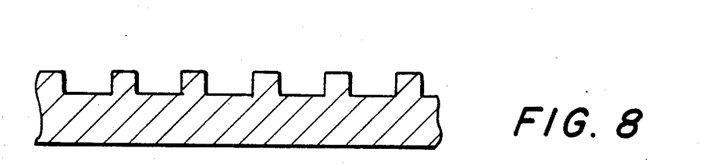
FIG. 8 is a sectional view of the rugged surface of a metal thin film layer utilized in yet a further embodiment of the invention.
Figure 9:
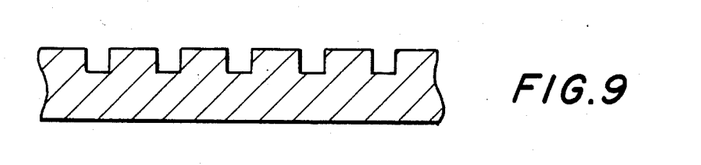
FIG. 9 is a sectional view of the rugged surface of a metal thin film layer utilized in accordance with the invention.
Figure 10:
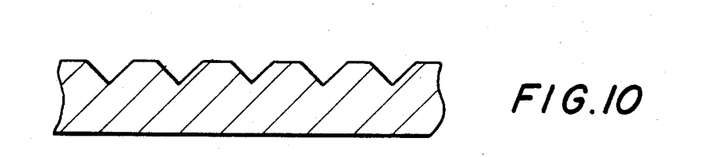
FIG. 10 is a sectional view of the rugged surface of a metal thin film layer utilized in yet a further embodiment of the invention.
Figure 11:
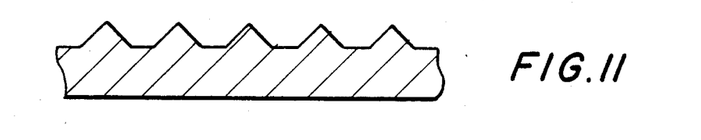
FIG. 11 is a sectional view of the rugged surface of a metal thin film layer utilized in yet a further embodiment of the invention.
Figure 12:
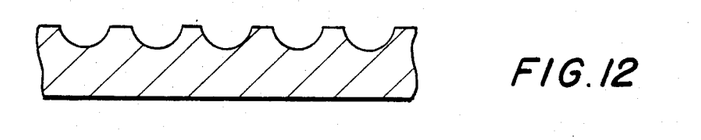
FIG. 12 is a sectional view of the rugged surface of a metal thin film layer utilized in yet a further embodiment of the invention.
Figure 13:
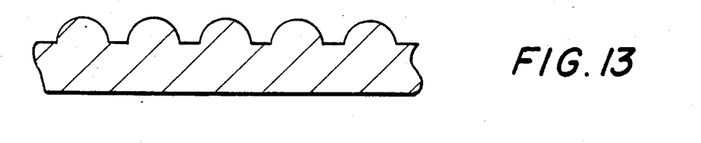
FIG. 13 is a sectional view of the rugged surface of a metal thin film layer utilized in yet a further embodiment of the invention.

In the second method, the metal thin film layer is first formed on the substrate by evaporation or sputtering and is heated to be recrystallized thereby providing the rugged surface. If aluminum or an aluminum alloy is used as the metal material, the metal thin film layer is recrystallized at a temperature in the range from about 100° C. to 600° C. The melting point of the film is about 660° C. This recrystallization causes the atoms in the metal thin film layer to be rearranged, and consequently, a metal thin film layer having a rugged surface of the jagged type illustrated in FIG. 5 is obtained. Generally, the difference between the top and bottom of the rugged metal surface formed by this method is approximately 0.1 to 2.0 μm.

In the third method, the thin metal layer is formed on the substrate by vacuum evaporation or sputtering and is heated to precipitate particles. A portion of the layer near the surface of the thin layer is removed by etching. This makes it possible to provide a metal thin layer having a rugged surface of the type illustrated in FIG. 6. This method will be explained in more detail in connection with the illustrations in FIGS. 16(a)-16(c).

Figure 16A:
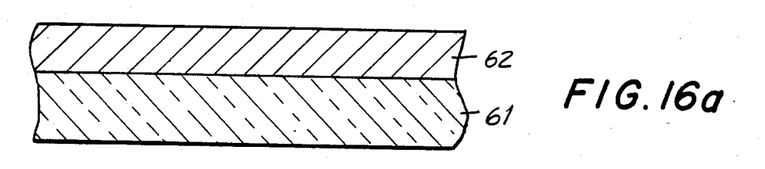
FIGS. 16(a), 16(b) and 16(c) are each cross-sectional views illustrating the process for forming the thin metal film layer with a rugged surface by etching the upper layer after precipatating an aluminum alloy including precipitated particles.
Figure 16B:
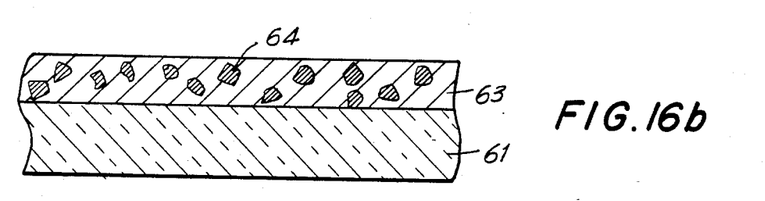
Figure 16C:
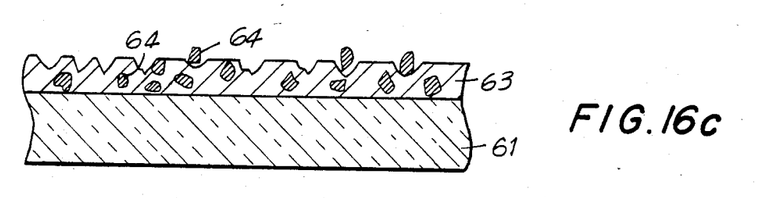

FIG. 16(a) is a sectional view of a substrate 61 and an alloy thin film layer 62 immediately after being deposited by vacuum evaporation. In FIG. 16(b), alloy thin film layer 63 is shown having precipitated particles 64 therein. When a portion of layer 63 near the surface thereof is etched, region where the precipitated particles were removed become concave as the etching speed is higher in the regions of the boundary surface between the particles and the alloy phase. This sectional view is shown in FIG. 16(c).

If an aluminum alloy including about 2.0 weight percent silicon is used for forming layer 63, an intermetallic compound of aluminum and silicon separates out at heating between about 200° and 500° C. The average particle diameter of this intermetallic compound and the average distance between these particles depends upon the concentration of silicon in the aluminum alloy and on the heating temperature. Accordingly, it is possible to form a metal thin film layer, such as layer 63 having a wide variety of desired rugged surfaces by selecting the appropriate parameters of the amount of silicon and the temperature.

As a further example, when thin film layer of aluminum alloy 63 containing about 2 weight percent silicon is heated for 20 minutes in an atmosphere of nitrogen at 400° C., intermetallic compounds of aluminum and silicon having a particle diameter of between about 0.2 and 1.0 μm precipitate out. The average distance between the particles is in the range of from about 0.1 to 3.0 μm.

The alloy thin layer having a thickness of 1.0 μm is heated to precipitate the particles and a surface layer of about 0.2 μm is removed by etching, the etched surface becomes rugged and appears white. In this case, the difference in height between the top and bottom of the rugged surface regions is from 0.3 to 0.5 μm. Additionally, the average distance between concave portions is in the range from about 0.2 to 3.0 μm.

An aluminum material, such as aluminum or aluminum alloy, as utilized in the examples noted above, has a surface reflectance from about 90 to 92 percent in the visible light range. Similarly, a silver material has a surface reflectance of about 94 to 98 percent. In view of this, silver is preferable as the metallic material for forming the thin layer having a rugged surface with a high degree of whiteness. However, silver is substantially more expensive than aluminum and additionally is difficult to alter to a rugged surface by recrystallization or precipitation. Thus, if silver is desired, it is preferable to apply a thin layer of silver on an aluminum or aluminum alloy thin layer having a rugged surface for obtaining a metal thin layer with a higher degree of whiteness.

It is also possible to obtain the rugged surface of a metal thin layer by sand blasting. This method is also known by the name of "shot blasting". In this method for forming a rugged surface, hard and fine particles, such as $SiO_2$ or $Al_2O_3$ are shot against the metal surface by compressed air. If the diameter of the fine particle is, for example, in the range of about 1 μm, the metal thin layer can be provided with a rugged surface having a height H of about 1 μm from the concave portion to the convex portion. The shape of a surface formed in this manner is similar to the illustration in FIG. 5.

The several methods mentioned above permit forming of a metal thin film layer having a rugged surface suitable for use in a device constructed and arranged in accordance with the invention. In this connection, for the purpose of obtaining a high degree of whiteness, it is desirable that the thickness of the metal thin film layer should be in the range of about 0.1 to 3.0 μm. In this case, the difference between the top and bottom of the rugged surface should be in the region between about 0.01 to 2.0 μm with an average distance from a convex portion to the next convex portion in the range of about 0.05 to 50 μm.

In the liquid crystal display device constructed and arranged in accordance with the invention, the liquid crystal driving elements are arranged in a matrix on a substrate which may be a semiconductor. In this case, the liquid crystal driving elements are monolithically formed on the substrate. When a glass plate is the substrate thin film elements, such as a film transistor and a thin film capacitor are formed thereon. In both the embodiments wherein the semiconductor substrate and the glass plate are used, at least a portion of the metal thin film layer having a rugged surface can serve as a connection between the liquid crystal driving elements or as an electrode for driving the liquid crystal material.

Figure 17:
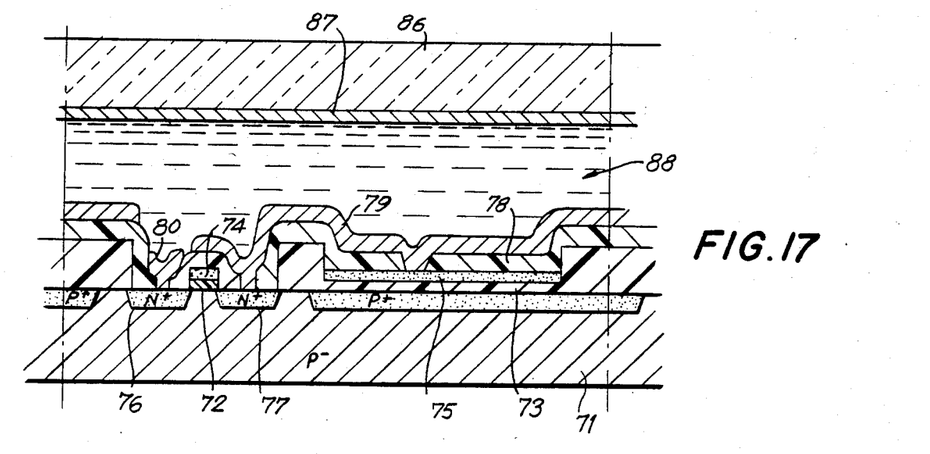
FIG. 17 is a cross-sectional view illustrating a structure of a liquid crystal display device including a semiconductor substrate having an aluminum or aluminum alloy thin film layer thereon.
Figure 18:
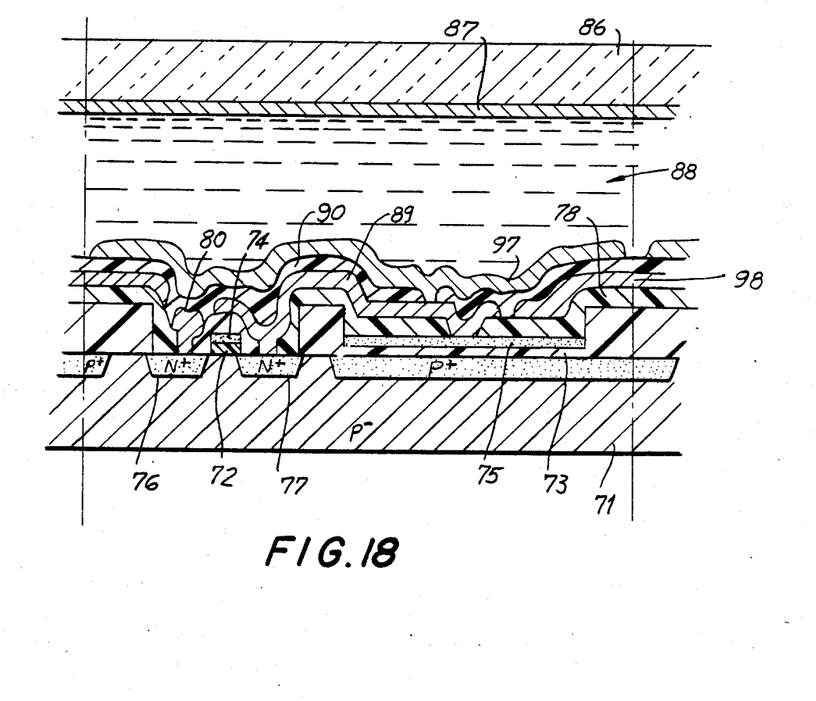
FIG. 18 is a cross-sectional view of the type of device illustrated in FIG. 18 wherein the semiconductor substrate includes two aluminum or aluminum oxide thin film layers.

Referring to FIGS. 17 and 18, embodiments of a liquid crystal display device constructed and arranged in accordance with the invention wherein the liquid crystal driving elements are monolithically formed on a silicon substrate 71 is shown. These sectional views show the liquid crystal display device including an upper glass plate 86 and semiconductor substrate 71 on which an aluminum or aluminum oxide thin film layer is shown. In the embodiment illustrated in FIG. 17, a single thin film layer 79 is provided and in the illustration in FIG. 18, two thin film layers 98 and 97 are provided. In each embodiment, a Si gate MOS transistor is used in the liquid crystal driving element circuit of FIG. 3. However, this invention is not intended to be limited to this circuit.

In the embodiments illustrated in FIGS. 17 and 18, substrate 71 is a Si semiconductor formed with a gate oxide film 72 of an MOS transistor, and oxide film 73 for forming a capacitor, a polysilicon electrode 74 for a gate, a capacitor 75, a diffusion layer 76 defining a source region, a diffusion layer 77 defining a drain region, and insulating film 78, and image line 80 for providing an image signal, an upper glass plate 86, a common electrode 87 of a transparent conductive material disposed on upper glass plate 86 and a layer of a guest-host liquid crystal material 88 in the space between glass plate 86 and substrate 71. In the embodiment illustrated in FIG. 17, a metal thin film layer 79 deposited on insulating film 78 functions as a liquid crystal driving electrode. Image signal line 80 and liquid crystal driving electrode 79 are metal thin film layers, each having a rugged diffusing surface as described above.

In the embodiment illustrated in FIG. 18, multi-layer film of a first metal thin film layer 98 having a rugged surface is disposed on insulating film 78 for irregularly reflecting incident light in a scattered manner. A thin insulating layer 90 is disposed on connection 89 and first metal thin film layer 98. A liquid crystal driving electrode 97 is disposed over thin insulating layer 90 and is electrically connected to connection 89 for coupling to drain region 77. Liquid crystal driving electrode 97, image signal line 80 and connection 89 are each a metal thin film layer having a rugged surface formed in a similar manner to metal thin film layer 98. As mentioned above, as the liquid crystal display device constructed and arranged in accordance with this embodiment of the invention has a lower substrate presenting a diffusing white appearance, an improved display is obtained by utilizing a guest-host type liquid crystal material.

In the embodiments of the invention illustrated in FIGS. 17 and 18 wherein the liquid crystal display driving elements are monolithically formed in the substrate, the rugged surface of the liquid crystal driving electrodes have concave and convex regions in the metal thin film layer itself. In addition to these, comparitively large step regions occur where the MOS transistor and capacitor of the addressing circuit are formed in the semiconductor substrate. The concave and convex regions and the step regions of the metal layer electrode surface have a negative influence when orienting the surface. In order to overcome this, a transparent film is disposed on the surface of the liquid crystal driving electrode in order to make the upper surface itself even, thereby increasing the orientation effect. The transparent film may be, an organic resin, such as a silicone resin, an epoxy resin and a polyimide resin. Alternatively, a transparent inorganic resin may be used to make the surface even.

A glass plate may also be used as a substrate in a liquid crystal display device in accordance with the invention. In this case, the liquid crystal driving elements are formed from a metal thin film layer having a rugged surface. The white layer is formed in the same manner as the liquid crystal display device utilizing a semiconductor substrate as described above in detail. In the embodiment wherein a glass plate is used, if a diffusing white glass plate is employed in place of the glass plate noted above, a device having improved display characteristics can be obtained.

Figure 19A:
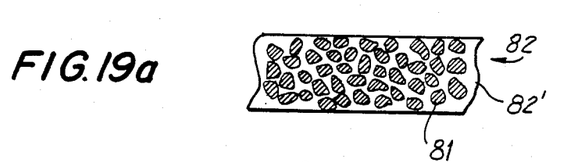
FIGS. 19(a) and 19(b) are sectional views of a diffusing white thin film layer formed by depositing a mixture of metal oxide particles in a transparent resin.
Figure 19B:
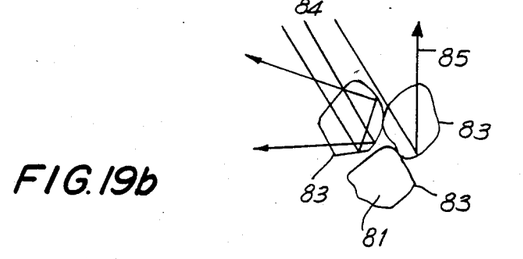

Referring now to FIGS. 19(a) and 19(b), a white thin film layer formed for an insulating layer of inorganic resin 82 containing fine metal oxide particles 81 dispersed therein is shown. In FIG. 19(a) a sectional view of layer 82 is shown. In accordance with this embodiment of the invention, white thin film layer 82 is a layer of organic resin 82' which is both transparent and adhesive. The illustration in FIG. 19(b) illustrates how insulating layer 82' appears white. When an incident light 84 enters into layer 82 and strikes fine particles of metal oxide 81, the light is reflected totally on the interface 83 between fine metal oxide particles 81 and organic resin 82' repeatedly before being transmitted out in scattered directions. Even if rays of incident light 84 enter in parallel to each other, they are reflected in random directions causing insulating 82 to appear white. Any white paper, textile, sand, pigment and coating material appears white based on the same principal. The insulating layer must be thick enough to appear white, because the light entering from the outside is transmitted through the insulating layer as if it is thin. The parameter relating to the thickness of the layer required to appear white is denominated covering power, which increases as the refractive index increases and approaches a maximum when the size of the fine particles is approximately in the range from about 0.2 to 0.3 $\mu$m.

Among the metal oxides suitable for use is titanium dioxide which has a high refractive index of 2.5 to 2.9, and accordingly is the most favorable for obtaining a white insulating film. This insulating film may be formed on the substrate by printing or spraying. In this connection, if fine particles of titanium dioxide are used, the thickness of the insulating film should be in the range of from about 10 to 15 $\mu$m in order to provide a sufficiently white appearance. If an insulating film is disposed on the metal thin layer having a rugged surface, a thinner insulating film may be used. In this case, the thickness should be in the range of from about 5 to 25 $\mu$m in order to provide sufficient whiteness.

Figure 20:
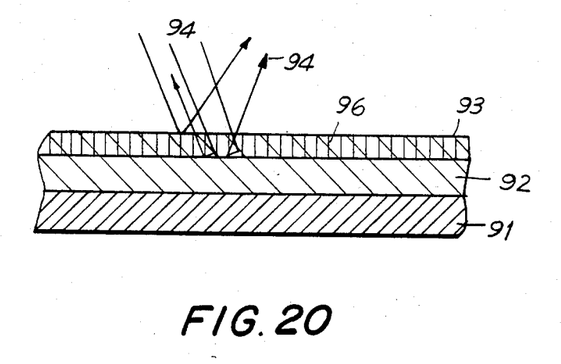
FIG. 20 is a cross-sectional view of an anodized aluminum alloy thin film layer in accordance with the invention.

When the metal thin film layer is aluminum or an aluminum alloy, the upper surface is anodized and a thin layer of alumina ($Al_2O_3$) is formed thereon. When a thin aluminum or aluminum or aluminum-magnesium alloy is anodized in a sulfuric acid solution, the alumina layer will have a thickness in the range of from about 5 to 30 $\mu$m. This alumina layer has a honeycomb structure on the inner surface wherein the light is irregularly reflected and thereby appears white. Such an aluminum or aluminum alloy having an anodized layer may be utilized as a white thin film layer in accordance with the invention. For example, in FIG. 20, a substrate 91 having a thin layer of an aluminum alloy 92 thereon is shown. Aluminum layer 92 has an alumina layer 93 on the outer surface thereof having interface surfaces 96. An incident light 94 is scattered on interface 95 and is reflected as a scattered light 95, thereby appearing white.

In certain structures, the liquid crystal driving electrode and the liquid crystal material are in direct contact with each other. In this case, the metal of the liquid crystal driving electrode and the liquid crystal material itself react under direct current. This causes the liquid crystal and the liquid crystal display cell to deteriorate. Accordingly, in order to increase the reliability of the liquid crystal display device, it is important that the liquid crystal material not directly contact the liquid crystal driving electrode. In order to accomplish this, an insulating film is formed on the surface of the substrate or on the surface of the common electrode on the upper glass plate so as to interrupt this direct current. In a liquid crystal display device constructed and arranged in accordance with this embodiment of the invention, the life of the liquid crystal display cell can be extended by application of an insulating film for interrupting this direct current. A thin film layer of $SiO_2$, $Al_2O_3$, $Si_3N_4$, or the like may be utilized for forming the insulating film.

As noted above, in both the liquid crystal display cell utilizing a semiconductor substrate and a cell utilizing a glass plate on which a thin film layer is formed, the substrate has concave and convex regions having a height difference of about 0.1 to 3.0 μm resulting from the manner of forming the display elements in addition to small concave and convex regions on the surface of the metal thin film layer itself. Accordingly, if the plates are to be oriented, for example by depositing $SiO_2$ obliquely on the surface, there are cases where the orientation films will not form in the regions adjacent to the step regions of the driving elements. Accordingly, it is desirable to remove the large step regions resulting from formation of the driving elements.

Figure 21:
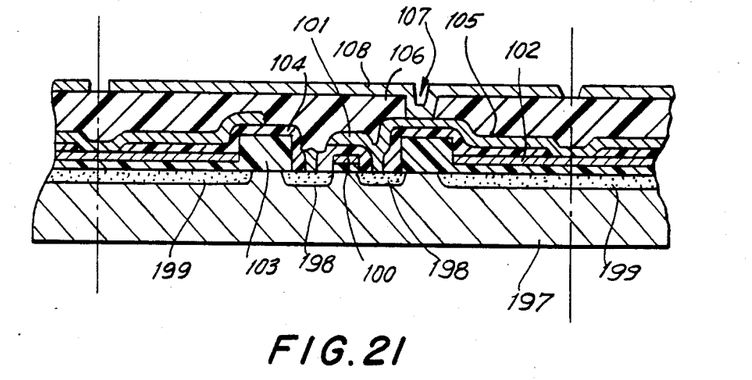
FIG. 21 is a cross-sectional view of a device in accordance with the invention wherein the surface of the semiconductor substrate has been made flat.

Referring now to FIG. 21, a sectional view of a semiconductor substrate 197 wherein the step regions of the device structure are filled with a transparent or opaque resin is shown. In this embodiment, a diffusion layer 198 for forming a source and drain region and a diffusion layer 199 as a stopper is formed in semiconductor substrate 197. A gate oxide film 100 of the MOS transistor and a polysilicon electrode 101 of the MOS transistor and an electrode 102 for a capacitor are formed on the surface of substrate 197. A field oxide film 103 and an insulating layer 104 are formed thereon. An aluminum or aluminum alloy thin layer 105 having a rugged surface is formed on thin insulating layer 104. The surface of semiconductor substrate 197 is flatened by application of an insulating film 106 of a transparent or an opaque organic resin. A through-hole 107 is formed and a metal thin film layer 108 is deposited for forming the liquid crystal driving electrode having an electrical connection to aluminum or aluminum alloy film layer 105.

As can be seen from FIG. 21, the step region formed on the surface of semiconductor substrate 197 and metal thin film layer 105 are filled. The concave and convex regions on the liquid crystal driving electrode provide a rugged surface and the only non-smooth regions are the concave portions for the through-hole region, such as region 107. Accordingly, the ratio of area where the orienting film is not formed by oblique deposition is substantially reduced. Therefore, if a metal layer having a rugged surface formed in accordance with this method is used for forming the metal thin film layer for the liquid crystal driving electrode, the substrate appears white.

In the embodiment illustrated in FIG. 21, if metal thin film layer 105 is used as an electrode for driving the display elements, insulating layer 104 made of an insulating material provides a flat surface. The transparent or opaque insulating resin utilized for insulating 104 may be a silicone or epoxy resin, however a polyimide resin is the most preferred. When a polyimide resin is used, a spinner polyimide resin is cured at a temperature from about 200° C. to 500° C. The resin layer is applied in a thickness of at least the height of the step regions.

Since a polyimide resin can be easily etched with hydrazine ($NH_2.NH_2$), sodium hydroxide (NaOH) or a fluorohydrocarbon plasma gas, throughhole 107 can be easily formed.

Figure 22:
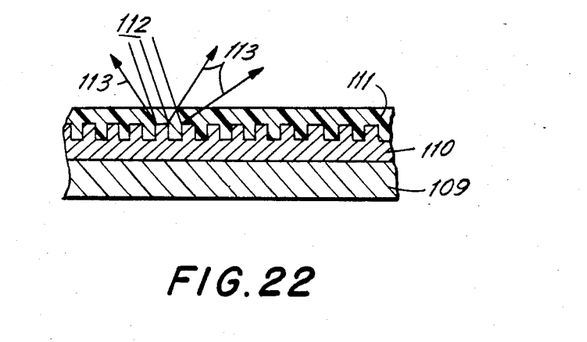
FIG. 22 is a cross-sectional view illustrating the structure of the thin metal film layer having a flattened surface.

Referring now to FIG. 22, a sectional view of a thin film layer wherein the surface is flatened by a transparent insulating film is shown. Thin metal layer 110 has a rugged surface of the type illustrated in FIG. 4 and a transparent insulating film 111 for making the surface flat is disposed thereon. A transparent insulating film on a thin metal film permits highly efficienct orientation and provides a suitable white appearance. Accordingly, when parallel rays of incident light 112 are transmitted through transparent insulating film 111, they arrive at rugged surface of thin metal layer 110 and are irregularly reflected as scattered light 113. Scattered light 113 is reflected in arbitrary directions so that the substrate appears white. Transparent insulating film 111 utilized in this embodiment may be of a polyimide resin, or similar resin as noted above. If thin metal layer 111 is the liquid crystal driving electrode, insulating film 111 formed in the surface thereof cuts off the direct current between liquid crystal driving electrode 110 and the liquid crystal material, thereby preventing the reaction between them.

The liquid crystal material to be used in a liquid crystal display device constructed and arranged in accordance with the invention is a guest-host liquid crystal material. The guest-host liquid crystal material is a mixture of a nematic liquid crystal material and a pleochoric dye or a mixture of a phase transition liquid crystal material and a pleochoric dye. In either case, arbitrary color displays can be readily obtained. Additionally, the device may be utilized with or without a polarizer. The surfaces of the base plates which constitute the liquid crystal cell may be oriented so that a vertical orientation or a horizontal orientation of the liquid crystal may be provided as follows.

The upper glass plate having a polyimide layer of a thickness of approximately 0.1 μ to 0.5 μ can be horizontally orientated by rubbing after the polyimide layer is deposited. The lower substrate may be horizontally orientated by obliquely depositing $SiO_2$. After this orientation, the angle defined by the direction of orientation between the upper glass plate and the lower substrate may be between 0 degrees and 180 degrees. Additionally, the upper glass plate may be oriented horizontally and the lower substrate may be oriented vertically. In the case where most of the area of the lower substrate to be oriented is a metal thin film layer having a rugged surface, the surface of the lower substrate should be oriented vertically in order to obtain maximum orientation efficiency.

As described in connection with each of the embodiments of the invention, the invention is directed to a liquid crystal display device which includes liquid crystal driving elements arranged in a matrix on one of the base plates which constitutes the liquid crystal display cell wherein the substrate appears white and guest-host liquid crystal material is utilized in the cell. This liquid crystal display device constructed and arranged in accordance with the invention has advantges in that the display characteristics are superior to many conventional devices. Moreover, the device can be driven at low voltage and low power consumption and can be provided in a small and thin configuration. Accordingly, a liquid crystal display device in accordance with the invention is suitable for use for a portable information processing apparatus, such as an electronic wristwatch as well as a portable television receiver.

It will thus be seen that the objects set forth above, among those made apparent from the preceding decription, are efficiently attained and since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device comprising a substrate and an opposed transparent electrode plate spaced apart from said substrate for defining a space therebetween, a liquid crystal material in said space, liquid crystal driving elements arranged in a matrix array on said substrate forming a matrix of liquid crystal display elements adapted to be displayed by selectively applying a potential to said liquid crystal driving elements in response to external signals, said substrate having a thin film layer thereon, said thin film layer including at least one metal thin film layer having a rugged diffusing surface and the surface of said thin film layer appearing diffusing white, said thin metal film layer serving as a liquid crystal driving electrode and the liquid crystal material being a guest-host liquid crystal including a pleochroic dye.

2. The liquid crystal display device of claim 1, wherein said thin film layer includes two metal thin film layers each having a rugged diffusing surface and an insulating film sandwiched therebetween.

3. The liquid crystal display device of claim 1, wherein at least a portion of said metal thin film layer serves as a connection between liquid crystal driving elements.

4. The liquid crystal display device of claim 1, wherein said metal thin film layer with a rugged diffusing surface is selected from the group consisting of aluminium or an aluminum alloy thin film layers, said layer formed by a process selected from one of a vacuum evaporation and a sputtering method.

5. The liquid crystal display device of claim 4, wherein said metal thin film layer with a rugged diffusing surface is formed by vacuum evaporation and recrystallized by heat treatment.

6. The liquid crystal display device of claim 1, wherein said metal thin film layer with a rugged diffusing surface is formed by etching to remove the surface layer of said metal thin film layer.

7. The liquid crystal display device of claim 6, wherein said metal thin film layer with a rugged diffusing surface is an aluminum alloy thin film layer formed by vacuum evaporation of said alloy thin layer on said substrate followed by heat treatment to form precipitated particles in said film and etching to remove the surface layer of said alloy thin film layer.

8. The liquid crystal display device of claim 5 or 7, wherein said metal thin film layer with a rugged diffusing surface is a thin film selected from the group consisting of aluminum, an aluminum alloy, silver and a silver alloy.

9. The liquid crystal display device of claim 1, wherein said metal thin film layer with a rugged diffusing surface is a thin film layer of a multi layer structure of at least two thin film layers and the top layer being silver.

10. The liquid crystal display device of claim 1, wherein said metal thin film layer with a rugged diffusing surface is formed by vacuum evaporation of said thin film layer on said substrate and sand blasting the upper face of said metal thin film layer.

11. The liquid crystal display device of claim 1, wherein said metal thin film layer with a rugged diffusing surface has concave and convex portions and has a thickness in the range of about 0.1 to 3.0 $\mu$m for each layer, the height from one concave portion to a convex portion being in the range of about 0.01 to 2.0 $\mu$m and an average distance from one concave portion to the next concave portion or from a convex portion to the next convex portion being in the range of about 0.05 to 50 $\mu$m.

12. The liquid crystal display device of claim 1, wherein the substrate on which liquid crystal driving elements are arranged in a matrix is a semiconductor substrate, said liquid crystal driving elements being monolithically formed therein.

13. The liquid crystal display device of claim 1, wherein said substrate on which liquid crystal driving elements are arranged in a matrix is a glass plate and said driving elements are thin film layer elements formed on said glass plate.

14. The liquid crystal display device of claim 13, wherein said glass plate is a diffusing white glass.

15. The liquid crystal display device of claim 1, wherein said thin film layer the surface of which appears diffusing white is an insulating layer of an organic resin having fine particles of a metal oxide dispersed therein.

16. The liquid crystal display device of claim 15, wherein the thickness of said insulating layer is in the range of about 1.0 to 100 $\mu$m and the metal oxide contained in said insulating layer is a titanium oxide particle having a diameter from about 0.01 to 2.0 $\mu$m.

17. The liquid crystal display device of claim 1, wherein said thin film layer the surface of which appears diffusing white is a partially anodized aluminium alloy thin film layer.

18. The liquid crystal display device of claim 1, wherein an insulating film for preventing direct current from flowing between the liquid crystal material and the electrodes for driving the liquid crystal material is provided on the surface of at least one of said substrate and the upper electrode plate.

19. The liquid crystal display device of claim 1, wherein the guest-host liquid crystal material is a mixture of a nematic liquid crystal and a ploechroic dye.

20. The liquid crystal display device of claim 1, wherein the guest-host liquid crystal material is a mixture of a phase transition liquid crystal and a pleochroic dye.

21. The liquid crystal display device of claim 1, wherein the surface of each plate constituting the liquid crystal display cell which is in contact with liquid crystal material is oriented in one of a vertical and horizontal direction.

22. A liquid crystal display device comprising a substrate and an opposed transparent electrode plate spaced apart from said substrate for defining a space therebetween, a liquid crystal material in said space, liquid crystal driving elements arranged in a matrix array on said substrate forming a matrix of liquid crystal display elements adapted to be displayed by selectively applying a potential to said liquid crystal driving elements in response to external signals, said substrate having a thin film layer thereon, said thin film layer including at least one metal thin film layer having a rugged diffusing surface and, the surface of said thin film layer providing diffuse reflections, said thin metal film layer serving as a liquid crystal driving electrode and the liquid crystal material being a guest-host liquid crystal including a pleochroic dye.

23. A liquid crystal device comprising a first substrate and an opposed second substrate spaced apart from said substrate for defining a space therebetween, a liquid crystal material in said space, liquid crystal driving elements arranged in a matrix array on one of said substrates forming a matrix of liquid crystal display elements, said liquid crystal display elements adapted to be displayed by selectively applying a potential to said liquid crystal driving elements in response to external signals, said driving elements formed of three superimposed conductive layers disposed on said one substrate, the first conductive layer selectively disposed on the substrate forming gate lines and gate electrodes for scanning the display elements in the array and electrodes of a capacitor associated with each liquid crystal driving element, a first insulating film disposed on the first conductive layer, a second conductive layer forming data signal lines selectively disposed across the first insulating film and electrically coupled to the capacitor electrode, a second insulating film disposed on the second conductive layer, and a third conductive layer forming a reflective liquid crystal driving electrode for each of the display elements selectively disposed across the second insulating film and electrically coupled to the second conductive layer, each of the second and third conductive layer formed of a metal.

24. The liquid crystal device of claim 23, wherein the first conductive layer on said substrate forming the gate lines and gate electrodes is formed of doped polycrystalline silicon.

25. The liquid crystal device of claim 23, wherein the second conductive layer is formed of an aluminum-silicon metal alloy.

26. The liquid crystal device of claim 23, wherein the third conductive layer is formed of aluminum.

27. The liquid crystal device of claim 23, wherein the second conductive layer is formed of an aluminum-silicon metal alloy and the third conductive layer is formed of aluminum.

28. A liquid crystal device comprising a first substrate and an opposed second substrate spaced apart from said first substrate for defining a space therebetween, a liquid crystal material in said space, liquid crystal driving elements arranged in a matrix array on one of said substrates forming a matrix of liquid crystal display elements, said liquid crystal display elements adapted to be displayed by selectively applying a potential to said liquid crystal driving elements in response to external signals, said driving elements including three superimposed conductive layers disposed on said one substrate, a first conductive layer selectively disposed on the substrate forming gate lines and gate electrodes for scanning the driving elements of the matrix array and electrodes of a capacitor associated with each liquid crystal driving element, a first insulating film disposed on the first conductive layer, a second conductive layer forming data signal lines selectively disposed across the first insulating film and electrically coupled to the capacitor electrode, a second insulating film disposed on the second conductive layer, and a third conductive layer forming a reflective liquid crystal driving electrode for each of the display elements selectively disposed across the second insulating film and electrically coupled to the second conductive layer, each of the second and third conductive layer formed of a metal, and the second insulating film disposed between the second conductive layer and the third conductive layer having a substantially smooth surface so that the third conductive layer disposed on the insulator will have a substantially smooth surface.

29. The liquid crystal device of claim 23 or 28, wherein the third conductive layer on the substrate forming the liquid crystal driving elements serves as both a driving electrode and a diffusing reflector.

30. The liquid crystal device of claim 23 or 28, wherein the liquid crystal driving element includes a switching transistor including a source and drain diffused regions in the substrate, said source and drain diffused regions being covered by one of the second or third layers in order to avoid invasion of incident light to the diffused regions.

31. The liquid crystal device of claim 30, wherein each liquid crystal element includes a diffused region in the substrate for forming a lower electrode of a capacitor associated with the element and the first conductive layer forms the upper electrode of the capacitor.

32. The liquid crystal device of claim 31, wherein the first conductive layer forming each gate line and gate electrode and upper electrode of the capacitor is formed of doped polycrystalline silicon.

33. The liquid crystal device of claim 23 or 28, wherein the second conductive layer is formed with a rugged surface.

34. The liquid crystal device of claim 33, wherein the rugged surface is formed by one of evaporation or sputtering and heat treatment after one of evaporation or sputtering.

35. The liquid crystal device of claim 34, including the further step of etching the surface after the heat treatment after one of evaporation or sputtering.

36. The liquid crystal device of claims 23 or 28, wherein the liquid crystal is a guest-host liquid crystal material including a pleochroic dye.

37. The liquid crystal device of claim 28, wherein the first conductive layer on said substrate forming the gate lines and gate electrodes is formed of pure polycrystalline silicon.

38. The liquid crystal device of claim 28, wherein the second conductive layer is formed of an aluminum-silicon metal alloy.

39. The liquid crystal device of claim 28, wherein the third conductive layer is formed of aluminum.

40. The liquid crystal device of claim 28, wherein the second conductive layer is formed of an aluminum-silicon metal alloy and the third conductive layer is formed of aluminum.

41. The liquid crystal display device of claim 28, wherein said insulating film is an organic resin.

42. The liquid crystal display device of claim 41, wherein the organic resin is selected from the group consisting of silicone resins, epoxy resins and polyimide resins.

43. The liquid crystal display device of claim 41, wherein said insulating film is selected from the group consisting of $SiO_2$, $Al_2O_3$ and $Si_3N_4$.

44. The liquid crystal display device of claim 28, wherein said insulating film is an inorganic resin.

45. A liquid crystal display cell provided with an internal surface having a substantially non-specularly reflecting appearance provided by deposition of a layer by evaporation and heating in such a way as to promote grain growth to provide a grainy surface topography with grain sizes in the range of about 0.05 to 50 microns extending to a depth in the range of about 0.01 to 2.0 microns.

46. A base plate for a liquid crystal display device including a guest-host liquid crystal material comprising a substrate having at least one metal thin film layer having a rugged diffusing white surface, wherein said metal thin film layer with a rugged diffusing surface is selected from the group consisting of aluminum, an aluminum alloy, silver and a silver alloy thin film layers, said layer formed by vacuum evaporation and recrystallized by heat treatment.

* * * * *